United States Patent
Gold et al.

(10) Patent No.: US 7,443,168 B2
(45) Date of Patent: Oct. 28, 2008

(54) COMPACT MAGNETIC SENSOR FOR MULTI-COMPONENT INDUCTION AND MICRO-RESISTIVITY MEASUREMENTS

(75) Inventors: Randy Gold, Houston, TX (US); Stanislav W. Forgang, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 2 days.

(21) Appl. No.: 10/834,411

(22) Filed: Apr. 29, 2004

(65) Prior Publication Data

US 2005/0242819 A1  Nov. 3, 2005

(51) Int. Cl.
*G01V 3/18* (2006.01)
*G01V 3/26* (2006.01)

(52) U.S. Cl. .......... 324/339; 324/333; 324/367

(58) Field of Classification Search .......... 324/323, 324/332, 333, 334, 338, 344, 345, 342, 343, 324/346, 349, 354, 355, 357, 363, 366, 367, 324/228, 229, 234, 239, 240, 242, 243, 347

See application file for complete search history.

(56) References Cited

U.S. PATENT DOCUMENTS

| | | | | | |
|---|---|---|---|---|---|
| 2,194,229 | A | * | 3/1940 | Johnston et al. | 324/232 |
| 3,007,107 | A | * | 10/1961 | Gondouin | 324/359 |
| 3,277,363 | A | * | 10/1966 | Schuster | 324/323 |
| 3,539,911 | A | * | 11/1970 | Hopkinson et al. | 324/343 |
| 4,536,713 | A | * | 8/1985 | Davis et al. | 324/324 |
| 4,933,640 | A | * | 6/1990 | Kuckes | 324/339 |
| 5,138,263 | A | | 8/1992 | Towle | |
| 5,172,480 | A | * | 12/1992 | Labuc et al. | 33/304 |
| 5,434,507 | A | * | 7/1995 | Beren et al. | 324/338 |
| 5,519,322 | A | * | 5/1996 | Pozzi et al. | 324/346 |
| 5,537,035 | A | * | 7/1996 | Fowler et al. | 324/220 |
| 6,400,146 | B1 | * | 6/2002 | Roy | 324/242 |
| 6,445,187 | B1 | | 9/2002 | Montgomery et al. | |
| 6,628,118 | B1 | * | 9/2003 | Amini | 324/334 |
| 6,975,120 | B2 | * | 12/2005 | Amini | 324/339 |
| 2004/0108854 | A1 | | 6/2004 | Nichols | |
| 2004/0113627 | A1 | * | 6/2004 | West et al. | 324/346 |

* cited by examiner

*Primary Examiner*—Kenneth J Whittington
(74) *Attorney, Agent, or Firm*—Madan, Mossman & Sriram PC (57) ABSTRACT

A compact magnetic sensor is described that is capable of use in pad-mounted applications and field-focusing applications. A downhole induction tool is described with a compact induction sensor having electromagnetic transmitters wound on a longitudinal core member of a C-clamp shaped transmitter core. The downhole induction tool is suitable for transmitting magnetic excitation fields in multiple directions, both parallel and transverse to the downhole induction tool's longitudinal axis, with minimal susceptibility to errors associated with parasitic eddy currents induced in the metal components surrounding the transmitter and receiver coils. The horizontal (transverse) members of the C-clamp shaped transmitter core can be rotated to orient a magnetic excitation flux path passing between the horizontal (transverse) members and through a downhole formation. The horizontal members can be replicated on a single longitudinal member to shape the magnetic excitation flux path.

30 Claims, 7 Drawing Sheets

COMPACT MAGNETIC SENSOR FOR MULTI-COMPONENT INDUCTION AND MICRO-RESISTIVITY MEASUREMENTS

BACKGROUND OF THE INVENTION

1. Field of the Invention

The present invention relates generally to the field of induction resistivity measurements using downhole induction tools for the evaluation of potential hydrocarbon bearing formations. The present invention relates to a method and apparatus that utilizes compact magnetic sensors for multi-component induction and micro-resistivity measurements with sufficient immunity to adverse effects of such parasitic eddy currents flowing on the surface of a down hole induction tool.

2. Summary of the Related Art

Electromagnetic induction resistivity tools are well known in the art. These induction resistivity well logging tools are used to determine the electrical conductivity, or its converse, the electrical resistivity, of earth formations, which are penetrated by a borehole. In the past, formation conductivity has been determined based on the results of measuring a magnetic field caused by eddy currents induced in the formation by a well logging tool. The resulting electrical conductivity measurements are used for, among other purposes, inferring the fluid content of earth formations. Typically, lower conductivity measurements (or higher resistivity) indicate a hydrocarbon-bearing layer in a formation. The physical principles of electromagnetic induction well logging are described in J. H. Moran and K. S. Kunz, *Basic Theory of Induction Logging and Application to Study of Two-Coil Sondes, Geophysics*, vol. 27, no. 6, part 1, pp. 829-858, SOCIETY OF EXPLORATION GEOPHYSICISTS, December 1962. Numerous improvements and modifications have been devised to the basic electromagnetic induction resistivity tools as described in the Moran and Kunz reference, supra. Some of these improvements are described, in U.S. Pat. No. 4,837,517 issued to Barber, U.S. Pat. No. 5,157,605 issued to Chandler et al. and in U.S. Pat. No. 5,600,246 issued to Fanini et al.

The conventional induction well logging tool is lowered into a borehole drilled into a hydrocarbon bearing formation in the earth. The typical resistivity well logging tool further consists of a sensor section and other equipment for acquiring resistivity data regarding the formation. A determination is made from the data regarding the physical parameters that characterize the formation surrounding the well bore. The typical sensor section, or mandrel, comprises one or more induction transmitters and receivers positioned along the tool's longitudinal axis. Electrical circuitry is provided to generate and apply an electrical voltage to the transmitter's induction coil. Circuitry is also provided to condition and process signals emanating from the formation, that are picked up by the receiver induction coils. The acquired data is then stored in the tool or sent to the earth's surface by means of telemetry or a wire line, which is also used to lower the tool into the borehole.

In general, the individual layers in a multi-layered or laminated hydrocarbon-bearing zone are difficult to detect when using a conventional induction well logging resistivity tool with transmitter and receiver induction coils having magnetic moments oriented only along the borehole axis. These multi-layered zones usually consist of thin alternating sand and shale layers. Oftentimes, the layers are so thin that a conventional logging tool with limited resolution cannot individually detect a layer. In this case, only the average conductivity of the multi-layer zone can be evaluated.

To address this problem, well loggers began using transverse induction logging tools to measure the conductivity of multi-layer zones. Transverse tools provide transmitters and receivers positioned so that their magnetic moments are oriented transverse to the tool's longitudinal axis. One such transverse induction well logging tool has been described in U.S. Pat. No. 5,781,436 issued to Forgang et al.

The response of transverse coil arrays is also determined by an average conductivity, however, it is the relatively lower conductivity of hydrocarbon-bearing sand layers that dominate this transverse coil conductivity estimation. The volume of shale/sand in multi-layer zone of a formation can be determined from measurements taken with a gamma ray or nuclear well logging tool. Consequently, the conductivity of individual shale and sand layers can be determined from a combination of the conventional and transverse induction logging tool measurements.

One of the main difficulties in interpreting the data acquired by a transverse induction logging tool is its vulnerability to the presence of a conductive well fluids in the bore hole. This condition is known as the well bore fluid invasion effect. A known method for reducing the unwanted impact of well bore fluid invasion effects on a transversal induction logging tool response was disclosed in L. A. Tabarovsky and M. I. Epov, *Geometric and Frequency Focusing in Exploration of Anisotropy Seams*, Nauka, USSR ACADEMY OF SCIENCE, Siberian Division, Novosibirsk, pp. 67-129 (1972) and also in L. A. Tabarovsky and M. I. Epov, *Radial Characteristics Of Induction Focusing Probes With Transverse Detectors In An Anisotropic Medium*, SOVIET GEOLOGY AND GEOPHYSICS, 20 (1979), pp. 81-90.

The Tabarovsky method uses a transverse induction logging tool. In the Tabarovsky method, the transverse induction transmitter induces currents into the formation adjoining the borehole by irradiating a magnetic field into the formation. In turn, induction tool receivers measure the magnetic field response associated with the currents induced in the formation. To enable a wide range of vertical resolutions and to facilitate effective suppression of the unwanted borehole effects, measurements of the magnetic field from the formation can be obtained at different separations or distances between the transmitter and receiver. However, even with these measurement techniques, the data logs obtained with a conventional transversal induction logging tools can be inconsistent and difficult to interpret. Moreover, these problems are exacerbated when logging through a sequence of varying conductivity layers.

In induction logging, the quality of acquired data primarily depends on the electromagnetic environment in which the logging tool operates. Thus, in an ideal case, the logging tool measures only those signals associated with the eddy currents induced in the formation by the primary magnetic field emanated by the induction tool transmitter. Variations in the magnitude and phase of the induced eddy currents occur in response to variations in formation conductivity. These variations are reflected as variations in the output voltage of induction receivers located in the induction tool. In conventional induction tools, these receiver voltages are conditioned and processed using analog phase sensitive detectors or processed algorithmically. The processing allows for determining both receiver voltage amplitude and phase with respect to the induction transmitter current or its magnetic field waveform.

There are also known Measurement While Drilling (or MWD) induction tools which typically utilize solenoid-type transmitter and receiver induction coils coaxial with the tool mandrel. These tools produce a "classical" set of induction measurements in the propagation mode. The tools measure attenuation and phase shift in the transmitted magnetic field due to the influence of the adjacent formation characteristics. Known MWD induction tools utilize two coaxial receiver coils positioned in the center of the mandrel and two sets of balanced transmitter coils on both sides of the receiver coils. This balanced coil configuration, when operating at two frequencies of, for example, 400 kHz and 2 MHz, enables the typical known induction logging tool to quantitatively evaluate eight different directional horizontal formation resistivities for a plurality of investigation depths. These known MWD induction tools, however, utilize sensors that are relatively large so that pad mounting of the sensor is not possible. Conventional sensor have difficulty operating in both conductive and nonconductive oil-based mud. Thus there is a need for a compact induction logging tool sensor that can be pad mounted and operates in both conductive (water-based) and nonconductive (oil-based) mud.

An induction tool's total magnetic moment is defined by the effective geometric area of the transmitter and receiver coils and by the transmitter current. The effective area of a particular coil has been determined by coil dimensions themselves and presence of conductive tool parts in proximity to the coil. By design, the transmitter and receiver coils are built with an effective geometrical area sufficiently large to achieve the maximum possible random noise-free measurements. A coil's geometric area is sufficiently large when non-productive energy losses can be adequately compensated. Such losses may occur in the tool while generating the primary magnetic field or detecting the secondary magnetic field flux induced from the formation. In many circumstances these limitations can be evaluated from respective tool numerical modeling and laboratory tests and then be corrected or calibrated.

It is well known in electromagnetic field theory that an externally generated alternating magnetic field radiated normal to the surface of a conductive body will induce eddy currents on this surface. These eddy currents, in turn, produce own magnetic fields that, according to Faraday's Law of induction, opposes the external field which induced them. Generally, the opposing field magnitude increases with increasing surface electrical conductivity and decreases with increasing distance from the source of the radiated magnetic field. For those who are skilled in the art it should be understood that an integral magnetic flux when in close proximity to a highly conductive metallic surface becomes negligible. Similar effects are present in induction tools having transmitter and receiver coils wound in a close proximity to the metal tool body.

Hence, when a transmitter induction coil is positioned closely above a conductive tool surface, the magnetic field of eddy currents induced on the tool surface oppose the primary source and thus decreases the integral flux radiated into the formation. Conversely, if a receiver induction coil is positioned proximately above a conductive tool surface, the magnetic field of eddy currents induced on this surface due to formation response will decrease the effective flux crossing the receiver coil. Both processes substantially reduce receiver output voltage and, consequentially, lower the tool's signal-to-noise ratio.

In the most practical tool designs, the transmitter field wavelength is significantly longer than the electromagnetic skin depth of the tool body material and the transmitter coil's linear dimension. This fact allows considering presence of a 180 degree phase shift between the transmitter and surface currents magnetic fields, therefore, neglect reactive electromagnetic losses in the tool body materials. In this situation presence of conductive tool parts in proximity to the sensor's coils results primarily in reducing an overall tool magnetic moment. However, with a further increase of operating frequencies the transmitter magnetic field wavelength becomes comparable with tool assembly dimensions and tool body reactive losses appear. Having reactive losses in the instrument significantly complicates both the shape of transmitted field and frequency response of the receiver. Thus, the eddy currents effect can become complex and their effect should be analyzed separately for every logging case. Thus there is a need for a method and apparatus for shaping the transmitted field and for efficiently dealing with eddy currents induced in the tool.

Parasitic magnetic coupling between the formation and the conductive metal parts of the downhole tool creates problems associated with another kind of parasitic eddy current induced on the tool body surface. Generally a high degree of magnetic coupling is desired between the tool transmitter and the formation. High magnetic coupling is also desirable between the tool receiver and the formation. This high magnetic coupling facilitates increased tool efficiency and increases the overall tool signal to noise ratio. The presence of conductive bodies typically found in the mandrel of known induction tools, however, becomes problematic. The conductive bodies result in the appearance of additional undesirable magnetic coupling between these conductive bodies and different sources of electromagnetic radiation/reception inducing parasitic eddy currents.

These parasitic eddy currents flow on the surface of the downhole induction tool and produce undesirable magnetic fields that adversely interact with resistivity measurements as additive error components. These induced magnetic fields couple directly into the receiver coil(s) and create undesirable offsets in measurement signals. Moreover, eddy currents due to formation-to-tool body coupling are temperature and frequency dependent, making adverse effects due to such parasitic eddy currents difficult, if not impossible to account for by known methods. Thus, there is a need for a method and apparatus that utilizes compact magnetic sensors for multi-component induction and micro-resistivity measurements with sufficient immunity to adverse effects of such parasitic eddy currents flowing on the surface of a down hole induction tool.

SUMMARY OF THE INVENTION

The present invention addresses the shortcomings and problems associated with the related art discussed above. The present invention provides a compact magnetic sensor capable of use in pad-mounted applications and field-focusing applications. The present invention utilizes compact magnetic sensors for multi-component induction and micro-resistivity measurements with sufficient immunity to adverse effects of eddy currents flowing on the surface of a downhole induction tool.

The present invention provides a compact electromagnetic transmitter wound on a convex or C-clamp shaped core suitable for transmitting magnetic fields in multiple directions parallel and transverse to the downhole induction tool's longitudinal axis. The novel transmitter operates with minimal susceptibility to errors associated with parasitic eddy currents induced in the metal components surrounding the transmitter and receiver coils. Horizontal (transverse) members of the convex or C-clamp shaped transmitter core are rotated to orient and shape the magnetic flux path passing through the distal ends of the horizontal (transverse) members and through a downhole formation. The horizontal (transverse) members can be replicated on a single longitudinal member to widen and shape the magnetic flux path. Additional features and advantages of the invention will become evident from a review of the following specification and figures. The core poles or ends through which flux flows point in substantially the same direction.

BRIEF DESCRIPTION OF THE DRAWINGS

The following figures show an example of the present invention in which like elements in different figures bear the same reference numerals.

DETAILED DESCRIPTION OF AN EXEMPLARY EMBODIMENT OF THE PRESENT INVENTION

The present invention provides a method and apparatus for multi-component open hole induction measurements induction logging in well filled with either conductive mud (i.e., fresh water based) or non-conductive mud (i.e., oil-based). The present invention provides a simple implementation of an induction tool that it is sufficiently compact for use in a pad-mounted induction tool configuration. The present invention provides a compact magnetic sensor capable of use in field focusing applications for multi-component induction and micro-resistivity measurements with sufficient immunity to adverse effects of parasitic eddy currents flowing on the surface of a down hole induction tool.

In one exemplary embodiment of the present invention, an induction transmitter is provided constructed with a convex or C-clamp shaped core. The convex or C-clamp shaped core has a longitudinal member and two horizontal (transverse) members. A horizontal (transverse) core member is positioned at each end of the longitudinal core member. The core ends or poles, the "feet" of the C-clamp shaped core, are exposed to the well bore and radiate magnetic flux into the adjacent formation. The core ends point in substantially the same direction, however, the directions may vary with respect to each other while remaining within the scope of the invention. The shape of the core may vary from convex or c-clamp shape while remaining within the scope of the invention. The transmitter windings are wound preferably around the longitudinal member of the core. The combination of the core with the winding creates an "electromagnet" which, when excited by an alternating current provided by the transmitter driving electronics, generates magnetic flux having a flux density B inside the core. The magnitude of the flux density B is dependent upon the magnetic permeability and geometry of the core. In accordance with magnetic circuit theory, the system demagnetization factor limiting core flux density, B is sufficiently small when the core is at least a five to ten times longer than the core is wide. Upon satisfying this core length to width ratio, the permeability of the core is close to the bulk permeability of a ferromagnetic core material resulting in a significant flux density, B for a relativity low excitation current, J.

Due to the open, rather than self-contained core structure, the magnetic flux leaks from the core ends, that is, the feet of the C-clamp. The flux path flows from one horizontal (transverse) core member end, though the formation and returns to the other horizontal (transverse) core member end. The magnetic flux path direction, shape and width are dependent upon the relative positions of the core poles formed by the horizontal (transverse) core members.

The overall shape of the magnetic flux path, in the formation and outside of the induction logging tool housing also depends on the core shape and the relative dimensions of the longitudinal and horizontal (transverse) core members. The magnetic flux leaves one end of a first horizontal (transverse) core member and seeks a return path with minimal energy dissipation to a second horizontal (transverse) core member end. Thus, if the length of the longitudinal portion of the electromagnet core is relatively large as compared to any cross section of width of the core, e.g. a factor of 5 to 10, the magnetic flux tends to stay close to the core body. In this case the radiation pattern of the flux lines is similar to the flux lines associated with a dipole antenna and exhibits insubstantial flux leakage into the formation. As the C-clamp shaped core has extended horizontal (transverse) arms at the ends of the core, a substantial portion of the leaked flux from one horizontal (transverse) arm into the formation will travel through the formation and return to through the other horizontal (transverse) arm of the core. The shape of the flux path depends largely on the shape and relative positions of electromagnetic core poles.

In general, neither the flux generated by the electromagnet of the present invention nor the magnetic field of a conventional magnetic dipole loop antenna are homogeneous in the formation proximate to the electromagnetic field radiator. There is a tradeoff between flux magnitude and flux homogeneity which can be balanced by increasing the radius of curvature of the C-clamp shaped core, that is, increasing the length of the vertical bar forming the electromagnet core. In an alternative embodiment, a multiple-pair pole core design for the electromagnet is also provided to enable spatial focusing, i.e., shaping of the magnetic flux path in the formation.

By positioning the horizontal (transverse) core poles with one pole directly above the other, with both poles lying in a plane passing through the longitudinal axis of the tool and the vertical core member and parallel to the axis of the bore hole, an axial oriented magnetic field is projected into the formation surrounding the bore hole. A radial or horizontal (transverse) flux path is projected into the formation, when the vertical core member is positioned normal to the longitudinal axis of the tool. That is, having both horizontal (transverse) core member poles at the same depth, with both poles lying in a plane perpendicular to the longitudinal axis of the tool. In general, the method and apparatus of the present invention, differs from conventional assemblies or structures utilized to amplify or intensify a magnetic flux field. The mechanism of decreasing core demagnetization proportionally boosts inductance of the transmitter that is sustained until the core becomes saturated.

One of the main advantages provided by the present invention is the ability to shape and orient the excitation field magnetic flux path which is projected into the formation. This shaping and orientation of the flux path field is accomplished by varying the orientation of the core longitudinal members and horizontal (transverse) members with respect to the longitudinal axis of the tool and the associated bore hole. Another advantage provided by the method and apparatus of the present invention is the provision of an induction tool having multiple magnetic flux sources capable of radiating simultaneously into the formation. The position of the induction receiver is selected based on multiple considerations. The receiver coil can be a stand alone air-filled coil or core type device. Moreover, the receiver coil or coils can be aligned for reception of a formation field emanating from essentially any direction.

Figure 1:
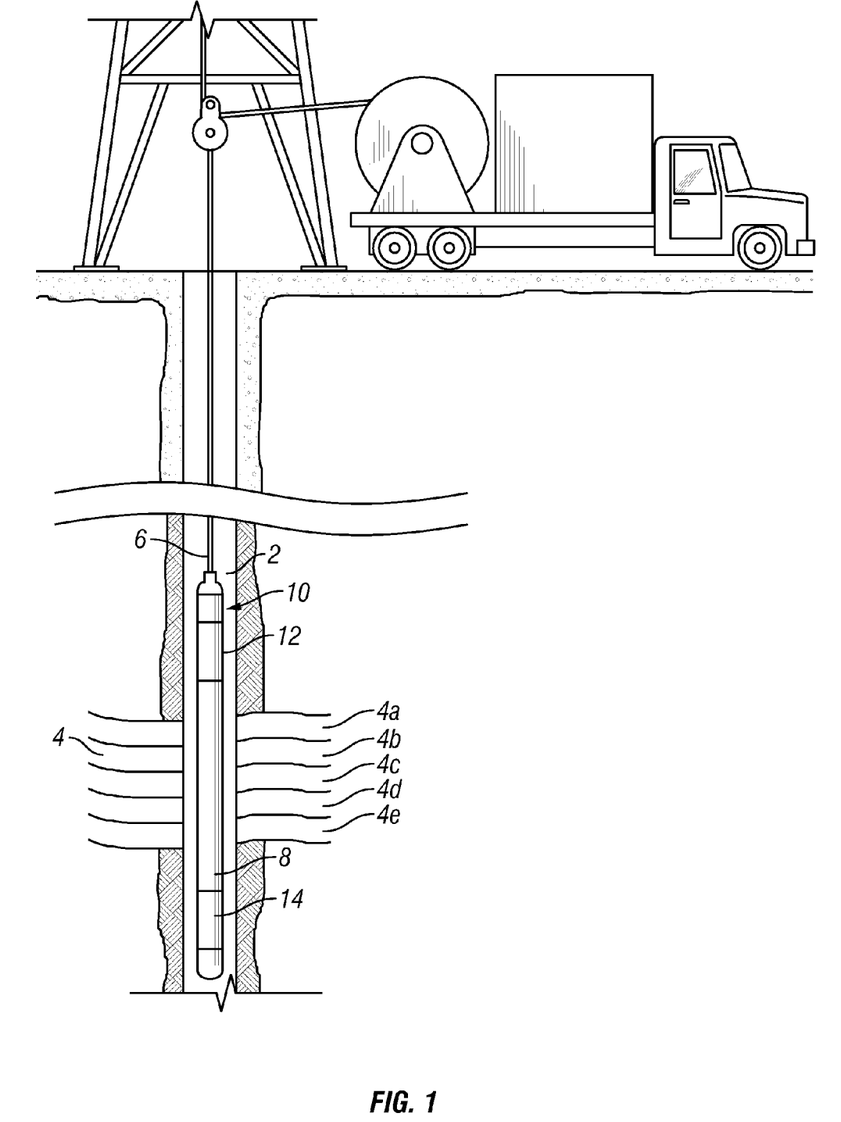
FIG. 1 depicts a schematic representation of an electromagnetic induction resistivity well logging tool disposed in a well bore drilled through a series of varying conductivity layers in a formation.

Turning now to FIG. 1, an electromagnetic induction resistivity well logging tool 10 disposed in a well bore 2 drilled through an earth formation 4 comprising a series of varying conductivity layers 4A, 4B, 4C, 4D and 4E is shown. The induction tool 10 is lowered into and withdrawn from the well bore 2 by means of an armored electrical cable 6 or another similar conveyance well known in the art. The induction tool 10 can be assembled from three subsections. The tool sections comprise an auxiliary electronics unit 14 disposed at one end of the tool 10; a coil mandrel unit 8 attached to the auxiliary electronics unit 14; and a receiver/signal processing/telemetry electronics unit 12 attached to the other end of the coil mandrel unit 8. The electronics unit 12 is typically electrically connected to a cable 6.

The coil mandrel unit 8 includes an induction transmitter coil, transmitter core and receiver coils. As explained below, the coils and core facilitate inducing electromagnetic flux fields in the earth formation 4 and receiving voltage signals induced by eddy currents flowing in the earth formation 4 as a result of the electromagnetic flux fields induced therein.

The auxiliary electronics unit 14, as explained below, includes a signal generator and power amplifier to cause alternating currents of selected frequencies to flow through the transmitter coil(s) in the coil mandrel unit 8. The receiver/signal processing/telemetry electronics unit 12, as will be further explained below. Electronics unit 12 can include receiver circuitry for detecting voltages induced in receiver coils in the coil mandrel unit 8. Electronics unit 12 can also include circuits for processing these received voltages into signals representative of the conductivities of various earth formation layers, shown as 4A through 4F. As a matter of convenience for the system designer, the receiver/signal processing/telemetry electronics unit 12 includes signal telemetry to transmit the conductivity-related signals to the earth's surface along the cable 6 for further processing. Alternatively the tool can store the conductivity related signals in an appropriate recording device (not shown) for processing after the tool 10 is withdrawn from the well bore 2.

Figure 2:
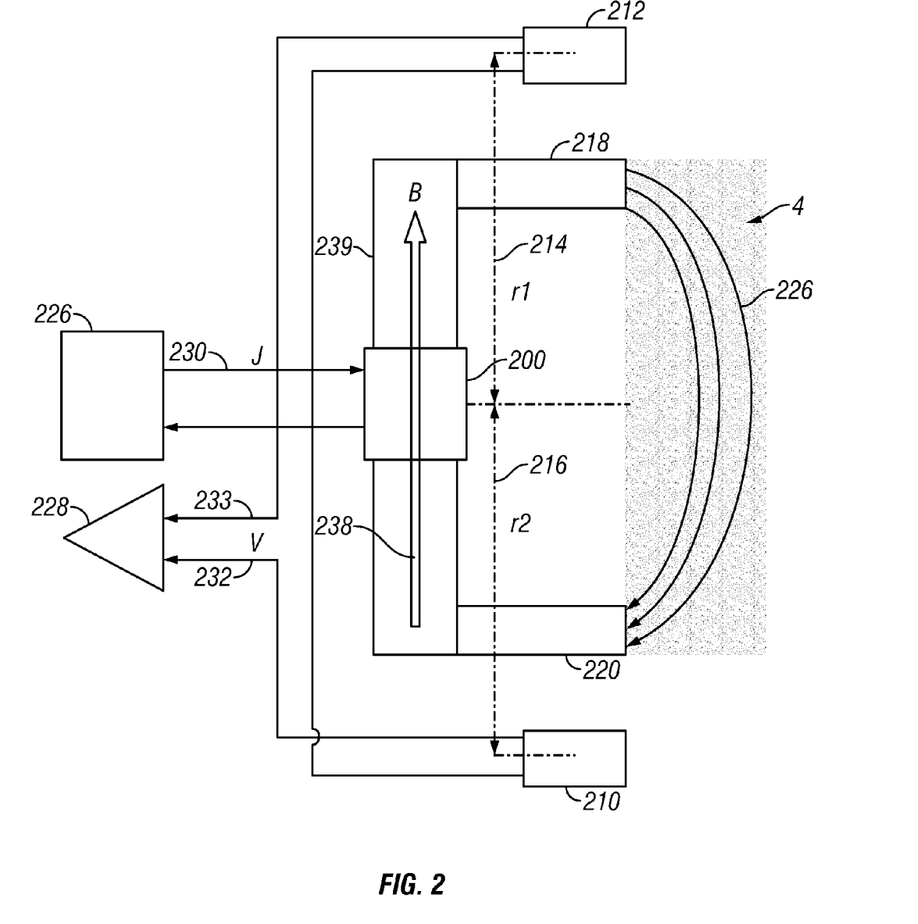
FIG. 2 depicts an example of the present invention using a C-clamp shaped core in a receiver mode coil utilizing differential amplification.

Turning now to FIG. 2, an example of an embodiment of the present invention is shown. The receiver coils 210, 212 are connected differentially and could be spaced at different distances 216, 214 from the core poles 220 and 218, respectively. The receiver coils 210, 212 comprise balanced receiver windings, each of which could have a different number of turns. The variation in coil spacing and number of turns substantially nullifies the overall signal from the primary transmitter field. In general, tracking the flux line passing through receivers, the flux leaves the pole 218, goes through receiver 212 from the bottom up, goes down and enters receiver 210 from bottom up and returns to the pole 220. Thus, if the receiver coils 210. 212 are wound in the same direction, subtracting their output voltages results in zero volts. If the receiver coils 210, 212 have a different number of turns or the area of the turns differs, the balance can be achieved by a respective change in spacing 214 and 216.

Transmitter windings 200 are wound around the circumference of core longitudinal member 239. Electronic driver circuitry 226a provides drive current 230 to excite the transmitter windings 200. A differential amplifier 228 receives signals 232 and 233 respectively from receivers 210 and 212 respectively. Typically, receiver coil balancing is performed to suppress the primary transmitter field and to increase the dynamic range of the tool measurement system. There are a number of applications, however, that do not require such balancing compensation. Moreover, the balancing can be achieved electronically. Thus, if the system has sufficient dynamic range to measure and digitize signals from individual receivers, the field balancing can be achieved numerically. Magnetic flux 238 travels along longitudinal core member 239 and forms external flux path 226. Flux path 226 leaves upper pole 218, enters the formation 4 and reenters lower pole 220.

Figure 3:
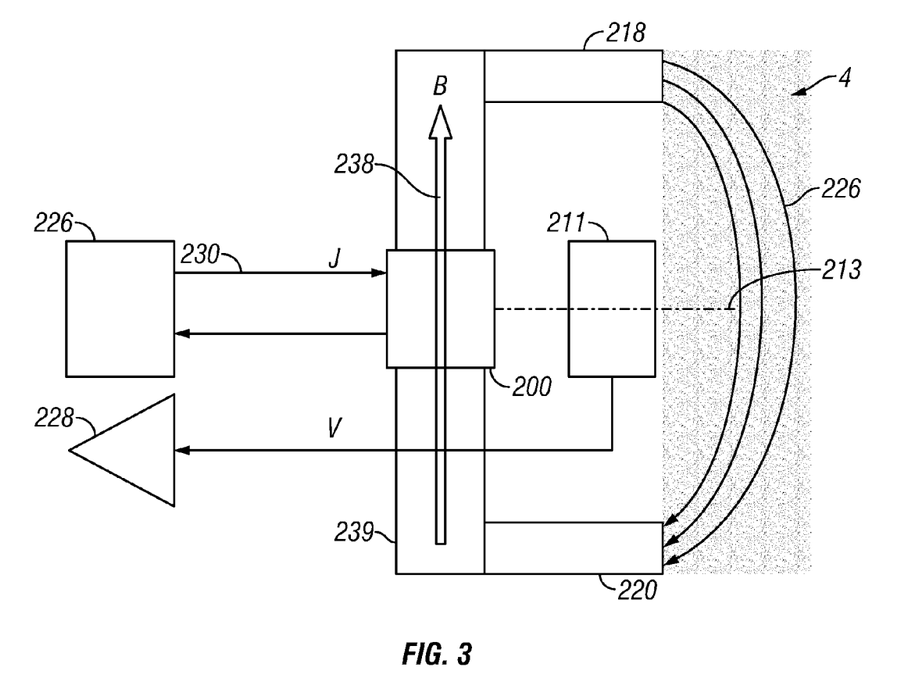
FIG. 3 depicts an example of the present invention using a C-clamp shaped core and a combined tri-axial receiver coil.

Turning now to FIG. 3, combined tri-axial receiver coils, that is, receiver coils physically mounted in substantially the same place can be used in a majority of receiver combinations utilizing the present invention. Thus, one of the locations for a cross-component (with respect to a predominant field direction) coil position is the axis of symmetry 213 of the C-clamp-shaped magnet, as shown in FIG. 3. The receiver measurement axis 213 is aligned with the axis of symmetry of longitudinal members, 218 and 220, which, for example, are oriented in the X-direction (the Y-direction being normal to the picture plane). Thus, if the receiver coil 211 had small dimensions (its coil diameter 5 to 10 times smaller than the vertical separation between the longitudinal members 218 and 220), the receiver coil 211 would not pick up a primary field from Z and Y-directions. However, if the receiver coil 211 has more substantial dimensions compared to the magnet, its winding turns should be shaped to avoid parasitic reception from the magnet's Z-component.

Figure 4:
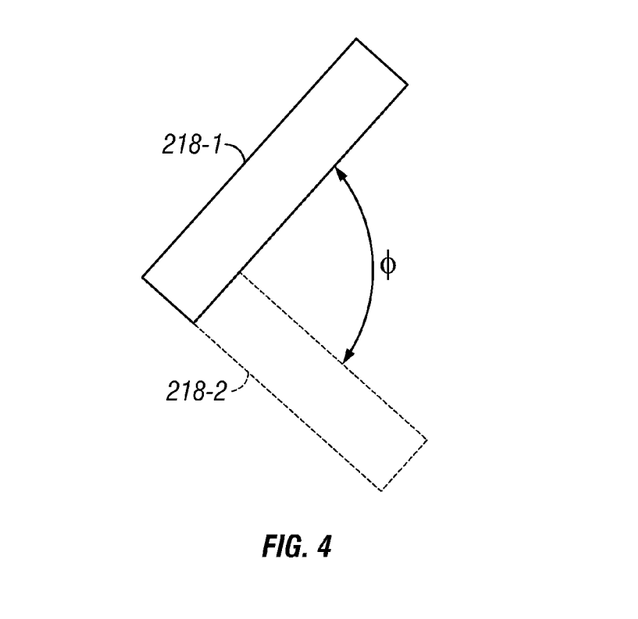
FIG. 4 depicts rotation of the horizontal (transverse) arms of the core to provide reorientation of the sensor in a transversal plane.
Figure 6:
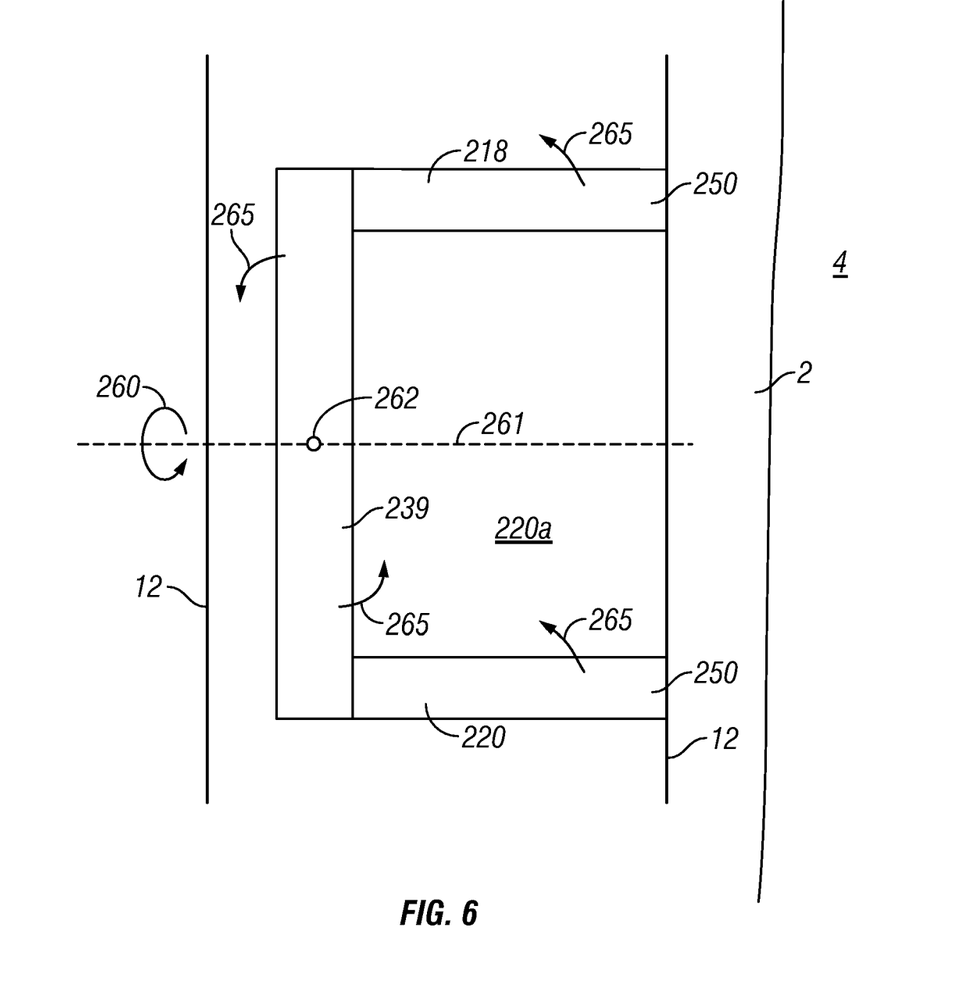
FIG. 6 depicts an entire induction device inside of an induction tool body having only the core end pieces exposed to the borehole.

Based on the general structural and geometric considerations associated with the present example of the method and apparatus of the invention, a plurality of measurement geometries, structures and schemes can be accomplished. Turning now to FIG. 4, rotating the horizontal (transverse) arms of the core through an angle Φ provide reorientation of the sensor in the transverse plane. Moving the core arms from a first position 218-1 through an angle Φ to a second position 218-2 (shown in a dashed outline in FIG. 4) in a plane perpendicular to the longitudinal axis of the induction logging tool and vertical core member, moves the excitation (and reception when the coil is used as a receiver) flux path an angle Φ with respect to the flux path at the first position. The core (used as a receiver or transmitter) can also be rotated in angular direction 260 around center axis 261 as shown in FIG. 6. The core (used as a receiver or transmitter) can also be rotated in angular direction 265 around point 262 as shown in FIG. 6.

Figure 5:
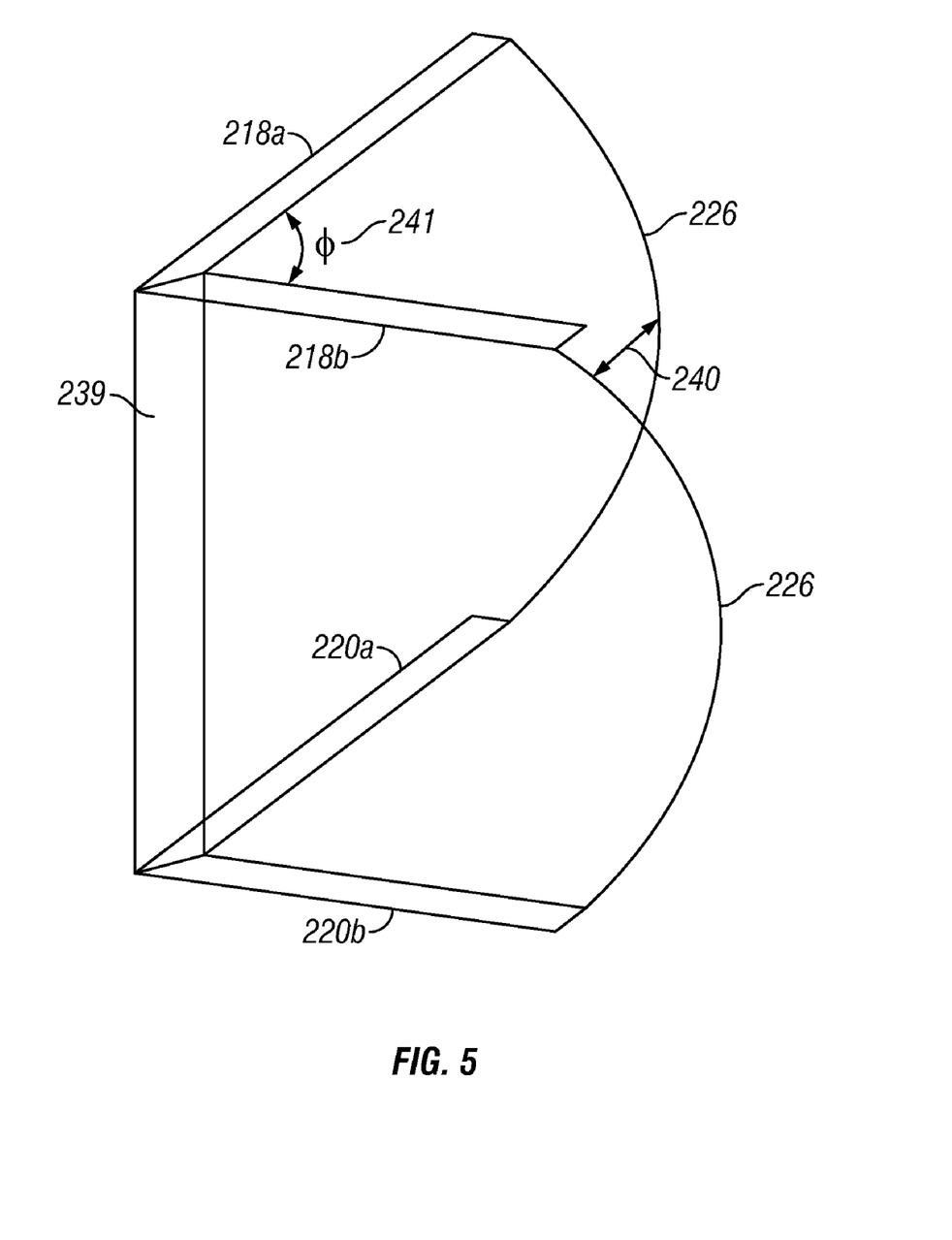
FIG. 5 depicts a plurality of horizontal (transverse) arms at each end of the longitudinal core member that widen the transmitted flux path and the area of investigation for measurements in the formation.

Turning now to FIG. 5, in another example of an embodiment of the present invention, as shown in FIG. 5, a plurality of horizontal (transverse) core member arms 218A, 218 B, 220A and 220B are attached at each end of the longitudinal core 239. These additional horizontal arms 218A, 218 B, 220A and 220B widen and shape the excitation flux path in the formation. A sensor array implementation is also provided in conjunction with magnetic shielding. The angle Θ between the horizontal (transverse) core member arms determines the width 240 of the flux path 226.

As shown in FIG. 6, in the present example of the structure of the present invention, the compact induction tool geometry enables enclosing an entire induction device inside of an induction tool body 12 having only the horizontal (transverse) core member end pieces 250 exposed to the borehole 2.

Figure 7:
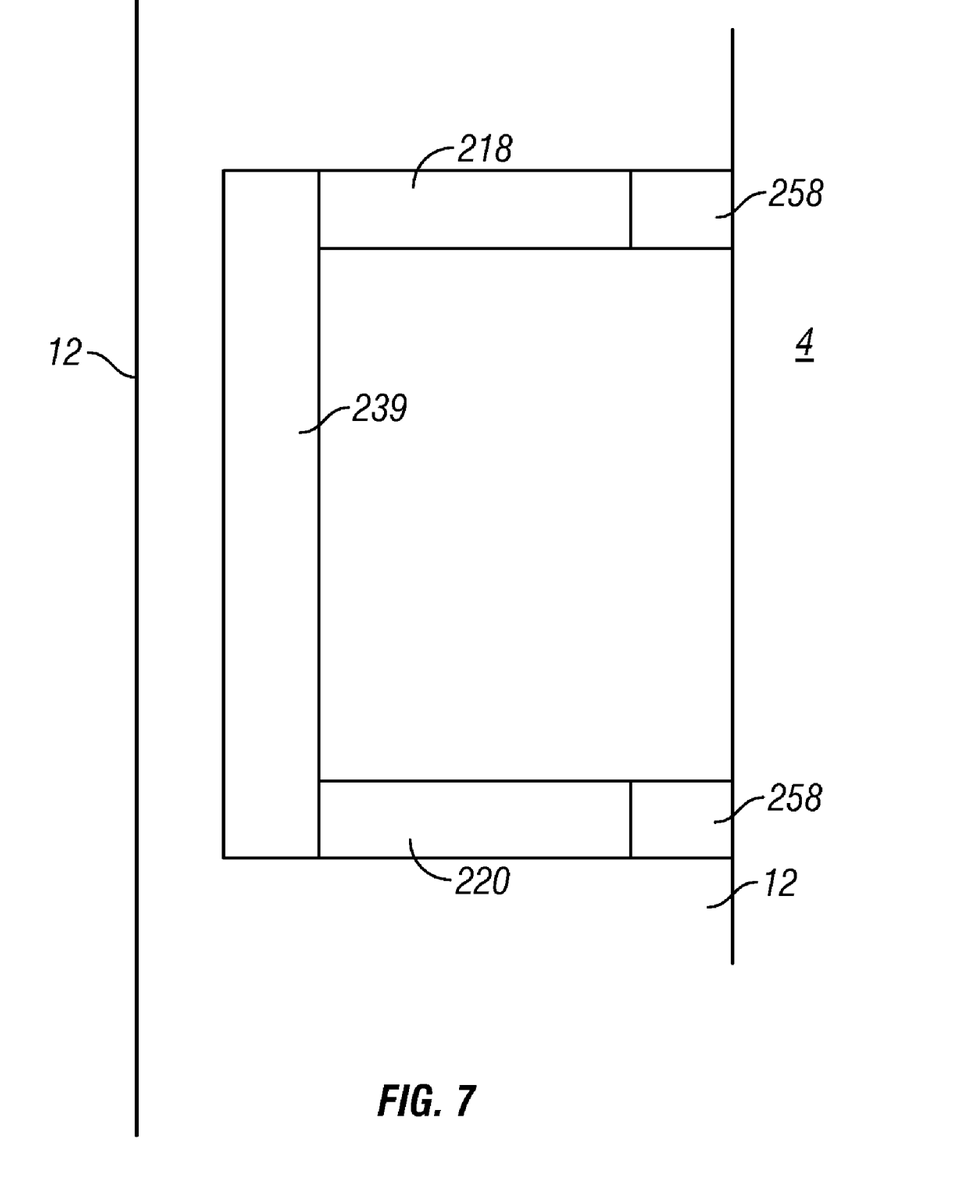
FIG. 7 depicts an induction device located inside of an induction tool body having only the core end pieces exposed to the borehole with insulation pads between the core ends and the borehole.

The core end pieces 250 are exposed to borehole to enable flux leakage through the formation. As shown in FIG. 7, between each core end piece 250 and the well bore 2 or formation 4 there can positioned a magnetic "plug" 258 protecting the core. However, a "magnetic short" of core member poles should be avoided. Avoiding a short is accomplished by the avoidance of ferromagnetic materials positioned between end pieces. However, if the sensor is located within a pad having a non-magnetic protective wall, there will be no such short. A substantial amount of unused flux, however, will return to the opposite pole by the shortest way possible, that is, through protective wall. Therefore, the thinner the wall, the better the tool's performance as less flux is returned through a thinner wall.

Figure 8:
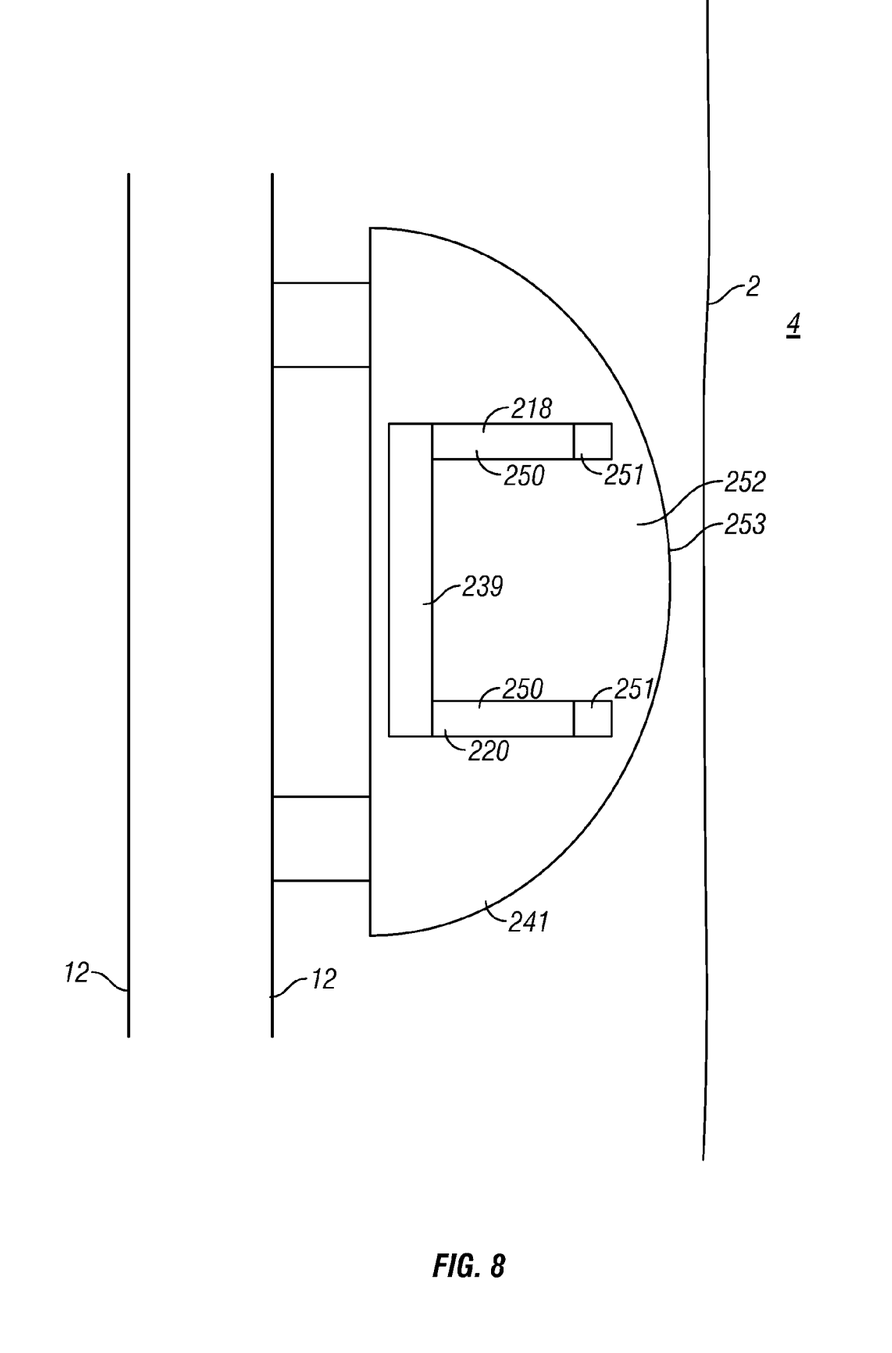
FIG. 8 depicts an induction device in a pad-mounted configuration.

Turning now to FIG. 8, in the case of a pad mounted induction sensor, the pad body profile design around the core poles in accordance with design considerations for minimization of eddy currents induced on the pad surface. As shown in FIG. 8, such design considerations include insulation (non-conducting) spacers 251 between the core horizontal (transverse) member (pole) ends and the pad housing 252. Moreover, eddy currents induced on the pad surface 253 due to magnetic flux leaked from the core poles is minimized by shaping the external profile of the pad 252. In the current example of the invention, the pad body is made from a non-ferromagnetic material to avoid flux distortions and shorting.

The need for shaping along with possible use of a non-conductive seal between ferromagnetic cores 218, 220 and conductive surfaces encapsulating the sensor is easily demonstrated considering an analogous example of a hypothetical electrical transformer. In the case of the exemplary embodiment, consider an imaginary transformer built on the core pieces 220, 218 and 200 having two windings. The primary winding is transmitter winding 200. The secondary winding is an imaginary electrically shorted single turn. This secondary winding would present a closed loop of conductive material surrounding the sensor with significant coupling to the primary winding 200. Thus, if conductive material has low losses at the tool's operating frequencies and is tightly bonded to the core, magnetic flux of the currents induced in this core material should almost equal the transmitter winding field. This results in substantially no field leaving the core pieces and a sharp reduction of the primary winding impedance, increasing tool power consumption.

Thus, if a ferromagnetic core 218 containing magnetic flux B were surrounded by a conductive material, the flux would result in inducing eddy currents on surfaces of the conductive material exposed to the flux. The eddy currents depend on the magnetic flux frequency and magnitude as well as on the core geometry, encapsulation geometries and electro-magnetic properties. These parameters determine magnetic coupling between the ferromagnetic core and the conductive material. If the conductive material is in close proximity to the core 218, the magnetic coupling and eddy currents magnitude will be maximized. Conversely, having a non-conductive seal (insulation) between the ferromagnetic core and the surrounding material allows some part of the magnetic flux B to return back through the seal resulting in a respective reduction of the eddy currents magnitude.

The eddy currents flowing in the encapsulation would unavoidably reduce the overall magnetic flux transmitted into the formation and increase electrical load which the sensor introduces to its driving electronics. This effect could be easily understood based on Faraday's Law of induction demonstrating that magnetic field of the induced eddy currents are opposing the transmitter field.

For those skilled in the art the above-mention effect could be also explained by a general electrical engineering example. This includes an imaginary AC transformer having a core and two windings, the primary with and applied driving voltage (injected driving current) and a secondary winding to be externally loaded. The amount of magnetic flux produced in the core as well as transformer input impedance depends upon the core parameters, magnetic coupling between windings and the secondary loading. The windings wound tightly around the core will have maximum coupling and the short circuit load would result in maximum secondary and primary winding currents with minimal integral flux in the core.

The proposed sensor has a full analogy with the above example and could be also considered as an AC transformer. This imaginary transformer would utilize a core 218, 220, and a transmitter winding 200 which serves as a primary winding. The conductive covering or encapsulation of the primary transformer introduces a secondary winding. The loading of the transformer and, respectively, the flux B depends on mutual core-to-encapsulation geometry and proximity, sensor operating frequency and material properties of the encapsulation. If there is no insulating seal between core 200 and encapsulation, the electrical load of this imaginary transformer will be large and maximized in practically the entire operational frequency range of the proposed device.

The shape of the core described herein as well as the direction in which the core ends point with respect to each other are important features of the invention and may be varied while still being within the scope of the invention.

The above example of a preferred embodiment has been provided for illustration purposes only and is not intended to limit the scope of the invention which is determined by the following claims.

What is claimed is:

1. A downhole tool for use in an open hole, comprising:
   a winding; and
   a core upon which the winding is wound, the core having a first core end and a second core end pointing in substantially the same direction, the winding and the core arranged to induce electromagnetic flux fields in a downhole formation surrounding the open hole so that magnetic flux leaks from the first core end and returns to the second core end with a magnetic flux path through the downhole formation;
   a first receiver and a second receiver, the first receiver positioned a first distance from the first core end uphole of the core and the second receiver spaced a second distance from the second core end downhole of the core; and
   a differential amplifier configured to amplify a first signal from the first receiver and a second signal from the second receiver.

2. The downhole tool of claim 1, wherein the core is substantially one of (i) c-shaped; and (ii) concave.

3. The downhole tool of claim 1, wherein the core and the winding form a transmitter.

4. The downhole tool of claim 1 further comprising a protective material adjacent the core.

5. The downhole tool of claim 1, wherein the winding further comprises a plurality of winding.

6. The downhole tool of claim 1, wherein the core is configured to be rotatable.

7. The downhole tool of claim 1, wherein the first core end and the second core end are exposed to the open hole.

8. The downhole tool of claim 1 further comprising:
a pad configured to enclose the core.

9. The downhole tool of claim 8, wherein an external profile of the pad around the first core end and the second core end is configured to reduce eddy currents.

10. The downhole tool of claim 8, wherein the pad is made from a non-ferromagnetic material configured to avoid shorting and field distortion.

11. The downhole tool of claim 1, wherein the first core end and the second core end are insulated.

12. The downhole tool of claim 1, wherein the core is configured to be rotatable around a center axis substantially perpendicular to a longitudinal axis of the downhole tool.

13. The downhole tool of claim 1, wherein the first core end and the second core end further comprise a plurality of core ends configured to widen a magnetic excitation flux path.

14. A method for logging a formation surrounding an open hole, comprising:
providing a winding;
providing a core upon which the winding is wound, the core having a first end and a second end pointing substantially in the same direction;
generating a magnetic flux path in a downhole formation using the core and the winding; receiving voltage signals induced by eddy currents flowing in the downhole formation surrounding the open hole associated with the magnetic flux path in a first receiver and a second receiver, the first receiver positioned a first distance from the first core end uphole of the first end and the second receiver spaced a second distance from the second end downhole of the second end; and
differentially amplifying a first signal from the first receiver and a second signal from the second receiver to estimate a parameter of the formation.

15. A downhole tool for use in an open hole, comprising:
a winding; and
a core upon which the winding is wound, a first core end and a second core end, the first and second core ends defining an air space therebetween, the winding and the core arranged to induce electromagnetic flux fields in a formation surrounding the open hole so that magnetic flux leaks from the first core end and returns to the second core end with a magnetic flux path through the downhole formation; and
a receiver placed substantially in the air space between the first core end and the second core end and configured to receive signals induced by the core and the winding in the formation surrounding the open hole.

16. The downhole tool of claim 15, wherein the core is substantially one of (i) c-shaped; and (ii) concave.

17. The downhole tool of claim 15, wherein the core and the winding form a transmitter.

18. A method for estimating a property of a formation, the method comprising:
providing a winding;
providing a core upon which the winding is wound, the core having a first core end and a second core end pointing in substantially the same direction, the first and second core ends defining an air space therebetween;
generating a magnetic flux in the formation by the core and the winding;
receiving signals from the formation responsive to the generated electromagnetic flux in a receiver placed substantially in the air space between the first core end and the second core end;
processing the received signals to estimate the property of the formation; and
recording the estimated property of the formation in a suitable medium.

19. The method of claim 18, wherein the core is substantially one of concave and c-shaped.

20. The method of claim 18, further comprising receiving signals by a tri-axial receiver.

21. The method of claim 18, further comprising:
rotating the core during taking of measurements downhole.

22. The method of claim 18, wherein the first core end and the second core end are exposed to the open hole.

23. The method of claim 18, further comprising:
enclosing the core in the a pad member and extending the pad member from a tool body for receiving the signals.

24. The method of claim 23, further comprising:
insulating the first core end and the second core end from the pad member.

25. The method of claim 24, wherein the pad member is made from non-ferromagnetic material to avoid shorting and field distortion.

26. The method of claim 23, further comprising:
reducing eddy currents using a pad member external profile around the first core end and the second core end.

27. A system for using a downhole tool in an open hole, the system comprising:
a surface controller configured to control the downhole tool in the open hole;
a winding; and
a core upon which the winding is wound, the core having a first core end and a second core end, each core end pointing in a selected direction, the first and second core ends further defining an air space therebetween, the winding and the core arranged to induce electromagnetic flux fields in a formation surrounding the open hole along the selected direction;
an extendable pad from the tool that encloses the core;
a receiver spaced apart from the core and placed in a space between the first core end and the second core end, the receiver configured to receive signals corresponding to the induced electromagnetic flux in the formation; and
a processor configure to process the received signals to estimate a property of the formation surrounding the open hole.

28. The system of claim 27, wherein the core is substantially concave or c-shaped.

29. The system of claim 27, wherein the receiver is placed spaced uphole or downhole from the core.

30. The system of claim 27, wherein the core is configured to be rotatable.

* * * * *

UNITED STATES PATENT AND TRADEMARK OFFICE
CERTIFICATE OF CORRECTION

| | | |
|---|---|---|
| PATENT NO. | : 7,443,168 B2 | Page 1 of 1 |
| APPLICATION NO. | : 10/834411 | |
| DATED | : October 28, 2008 | |
| INVENTOR(S) | : Randy Gold and Stanislav W. Forgang | |

It is certified that error appears in the above-identified patent and that said Letters Patent is hereby corrected as shown below:

Column 10, line 43, delete the word "and";

Column 10, line 67, delete "winding" and insert --windings--;

Column 11, line 33, delete the word "core";

Column 12, line 22, delete "core in the a" and insert --core in a--; and

Column 12, line 37, delete "winding; and" and insert --winding;--.

Signed and Sealed this

Twenty-third Day of December, 2008

JON W. DUDAS
*Director of the United States Patent and Trademark Office*